March 28, 1961 E. J. UHLIG 2,977,565
TUBE SOCKET SAVER CONSTRUCTION
Filed April 9, 1959

INVENTOR.
ERICH J. UHLIG
BY Kenyon & Kenyon
ATTORNEYS

United States Patent Office 2,977,565
Patented Mar. 28, 1961

2,977,565

TUBE SOCKET SAVER CONSTRUCTION

Erich J. Uhlig, 1123 Sycamore St., Haddon Heights, N.J.

Filed Apr. 9, 1959, Ser. No. 805,179

1 Claim. (Cl. 339—92)

This invention relates to a tube socket saver construction intended for use particularly with electron tube tester equipment to preserve the lives of the permanently installed sockets thereof and thus materially extend the life of the tester.

In electron tube tester equipment the sockets into which the tubes are temporarily inserted for test purposes are subject to heavy wear because of the repeated insertion and withdrawal of the electron tubes. This heavy wear limits the useful life of the socket and of the tester. Socket replacement is difficult because the electrical connections to them are permanent in order to preserve relative socket positions with respect to a panel surface and/or adjacent wires so as to prevent spurious oscillation and erroneous test results. Moreover, replacement of a worn out socket is a complicated operation involving disconnection of soldered joints, dislocation of the internal wired connections of the tester and careful replacement of such wiring and resoldering of connections to a substitute socket. In many cases, therefore, the useful life of the tester is limited to the relatively short life of its regular sockets.

Principal objects and features of this invention are the provision of a tube socket saver device intended for use with the regular socket of a tester and which saver is plugged into the tester's regular tube sockets and itself serves as an expendable electron tube receiver that may be discarded after it has been worn beyond useful condition and replaced simply without in any material way disturbing or impairing the test instrument socket or any of its permanent connections and wiring.

Other objects and features of the invention are the provision of a tube socket saver that may be affixed securely in position in the regular tube socket of a tester or the like to avoid its accidental dislocation or removal during its useful life and which may be readily detached and replaced after it has been worn out without requiring any rewiring, replacement or positional changes of the regular socket.

Additional objects and features of the invention are the provision of a simple and inexpensive tube socket saver device which can be discarded when worn out and quickly and easily replaced by a new one.

Additional objects and features of the invention will become apparent from the following specification and the accompanying drawing, wherein.

Figure 1:
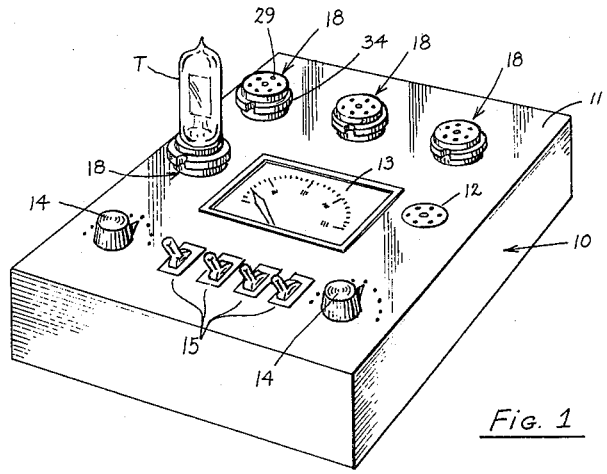
Fig. 1 is a perspective view of a tube tester or testing instrument including permanently mounted regular tube sockets and also shown equipped with tube socket savers embodying this invention.
Figure 2:
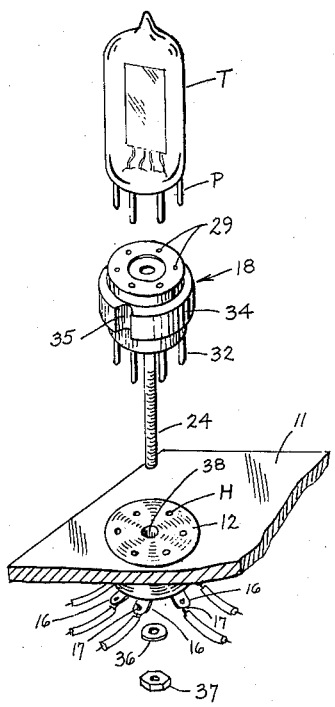
Fig. 2 is a perspective exploded view illustrating the manner of use of a tube socket saver of this invention in conjunction with a regular tube socket of the test instrument and an electron tube to be tested.
Figure 3:
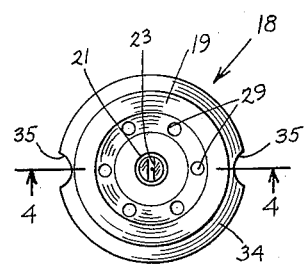
Fig. 3 is a plan view of the tube socket saver of this invention.
Figure 4:
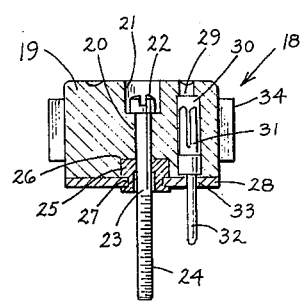
Fig. 4 is a sectional view of the tube socket saver taken along line 4—4 of Fig. 3.

Referring to the drawing, the reference character 10 denotes generally an electron tube tester or instrument of conventional type. This tester or instrument 10 has a panel 11, bearing a multiplicity of permanently mounted regular electron tube receiving sockets 12 each intended to mount temporarily for test purposes one or more of the different types of electron tubes T available commercially, which, as is well known have differently dimensioned bases with various numbers of connecting prongs P. The panel 11 also carries one or more indicating meters 13, control knobs 14 and control keys 15, operable as required so that the meter 13 will provide readings of test results on any particular tube T being tested.

The various prong receiving jacks (not shown) of each tube socket 12 are provided with lugs 16 to which electrical wiring connections of the instrument test circuits (not shown) are connected internally of the instrument as by soldering at 17. The sockets 12 themselves are fixedly supported on the panel 11 and are not readily removable therefrom, among other reasons, because of the soldered connections 17 to their lugs 16.

Replacement of any such a regular socket 12 requires removal of the panel 11 and unsoldering of the lug connections 17 as well as resoldering to the lugs of the new or replacement socket 12 substituted for the removed one. Care also must be taken to restore the internal wiring to its original condition and position to avoid spurious oscillations in the electrical circuits of the instrument or tester 10 and incorrect test readings on the meter 13.

Commonly, ordinary use of the tester 10 involves insertion of the prongs P of any particular tube T to be tested into the correct pin receiving holes H of the particular socket 12 of tester 10 intended to receive such tube T for test purposes, and subsequent manipulation of the control knobs and keys 14 and 15 to give appropriate test readings on the meter 13. The tube T is withdrawn after test. These repetitious mountings and dismountings of tubes T on and from the sockets 12 for such test purposes wear the latter out relatively quickly with the resultant complication hereinbefore mentioned.

In order to avoid excessive wear on regular tube sockets 12, of the tester 10, this invention contemplates use of a replaceable tube socket saver 18 with each of the sockets 12 of the testing instrument 10. Each tube socket saver 18 in the embodiment shown, comprises a generally cylindrical base member 19 of electrical insulating material for example of synthetic resin such as phenol formaldehyde or equivalent moldable material. A centrally-located, axially-extending hole 20 is provided in said base member 19. The upper end of this hole is counterbored at 21 to receive and submerge the head 22 of a bolt 23 which is mountable in said hole and whose threaded end 24 extends outwardly of the lower face of base member 19. The bolt 23 is adapted to be secured to base member 19 as by a nut 25 which when screwed onto the bolt 23 extends into a countersunk recess 26 in said base member. The nut 25 has an annular groove 27 within which a disc-shaped plate 28 of insulating material is mounted. When nut 26 is tightened on bolt 23 the face plate 28 lies clamped against the lower face of base member 19.

A plurality of axially extending tube prong receiving holes 29 are provided in the base member 19, being disposed and arranged on the upper face of said member 19 with required spacing to receive the prongs P of any selected tube or tubes T. Each hole 29 is enlarged in diameter at 30 to house a resilient prong engaging contact jack 31. These jacks 31 fit tightly in the hole portions 30 and are provided with contact pins 32 which extend outwardly of the lower face of base member 19 through appropriate openings 33 provided in the face plate 28. Face plate 28 serves to retain the jacks within holes 30 when it is clamped to the base member 19.

The outwardly projecting portions of contact pins 32 correspond in length, diameter and disposition to the lengths, diameters and dispositions of the prongs P of the tube T which is temporarily on said saver, so that they may be inserted into the corresponding pin receiving holes H of the appropriate socket 12 in lieu of the said prongs and thus provide direct electrical connection between said prongs and the circuits connected to the socket 12 in the tester 10.

The base member 19 has an annular flange 34 to facilitate its manipulation. This flange 34 has notches 35 located so as to facilitate proper orientation of the pins 32 relative to the socket holes H of socket 12 into which the tube saver 18 is intended to be mounted. In addition a washer 36 and securing nut 37 are provided for the bolt 23.

In use of a tube saver device 18, the threaded end of its bolt 23 is passed through the center hole 38 commonly provided on the regular socket 12. The tube saver pins 32 are oriented with respect to the socket holes H and the saver 18 is then pushed down to force its pins 32 into secure engagement with the resilient contacts (not shown) within the socket 12. Then the washer 36 is mounted on the lower end of bolt 23 and nut 37 is screwed and tightened onto said bolt 23 so as to securely fasten the tube socket saver 18 in its thus mounted position on socket 12 and prevent their separation unless said nut 37 is removed. Thereafter tubes T to be tested are mounted on the appropriate socket-mounted tube socket saver 18, by orienting its prongs P to the holes 29 of the tube socket saver 18 and then pushing said prongs into secure resilient contact with the respective jacks 31 of said tube socket saver 18.

The controls 14 and 15 of the test instrument 10 are then manipulated as hereinabove described for tube testing purposes. Upon completion of the test, the tube is withdrawn from the tube socket saver 18 in which it has been mounted without loosening or separating the latter from the socket 12 bearing it because of bolt 23 and nut 37.

When a tube socket saver 18 becomes worn beyond serviceable use as a result of frequent mountings and dismountings in it of tubes T to be tested, it is merely necessary to loosen nut 37 of the worn tube socket saver 18, and to withdraw the latter from the tube socket 12 to which it has been fastened and then substitute a fresh tube socket saver 18 of like kind therefor. The necessity for such change is relatively infrequent so that wear on the regular tube sockets 12 is still further minimized. Moreover, no disturbances of wiring or of the permanently soldered electrical connections 17 to the regular tube socket lugs 16 of socket 12 is ever required. The life of the tester 10 thus is prolonged far beyond that ordinarily available without the use of the tube socket savers 18 of this invention. Moreover, since tube socket savers 18 are relatively cheap, expensive upkeep is avoided and the necessity for test instrument repairs or replacement over long periods of time is avoided.

It is understood that the pattern arrangement of pins 32 on each tube socket saver 18 is identical with that of the prongs of the tube it is to receive and also of the particular socket with which it is to be used. The dimensions of each base member 19 likewise are conditioned by those of the socket 12 with which it is to be used.

While a specific embodiment of the invention has been described, variations in structural detail within the scope of the appended claim are possible and are contemplated. There is no intention therefore of limitation to the exact disclosure herein made.

What is claimed is:

A tube socket saver adapted to be assembled with an electron tube socket comprising a base member, jacks arranged in said base member in a pattern corresponding to the pattern of prongs of an electron tube, said base member having a plurality of holes in which said jacks are individually positioned, pin members integral with and extending from said jacks outwardly of said base member in the same pattern as said prongs and being insertable into the socket in lieu of said prongs on assembly of said saver with said socket, said base member being generally cylindrical in shape, a plate member for retaining the jacks in the holes and through which said pin members project, said base member having a counter-bored hole, a headed bolt whose head lies submerged in the counter-bored hole, said bolt extending through said plate member, a nut member screwable on said bolt for fixing said plate member in jack retaining position against said base member, a releasable tightening nut also screwable onto said bolt for preventing separation of the assembled saver and a tube socket during insertion into and withdrawal of prongs of said electron tube from jacks of said saver base member, an annular peripheral flange on the cylindrical surface of said base member to facilitate manipulation thereof and said flange having an orientation indicating recess thereon.

References Cited in the file of this patent

UNITED STATES PATENTS

| 937,427 | De Reamer | Oct. 19, 1909 |
| 1,778,062 | Butzke | Oct. 14, 1930 |
| 1,830,790 | Greaves et al. | Nov. 10, 1931 |
| 2,325,825 | Baumbach | Aug. 3, 1943 |
| 2,702,893 | Paulson | Feb. 22, 1955 |

FOREIGN PATENTS

| 573,514 | France | Mar. 12, 1924 |